March 1, 1960 R. E. HESS 2,926,396
BLOWER FOR MOTOR-DRIVEN VEHICLES HAVING WINDSHIELDS
Filed Nov. 27, 1957 2 Sheets-Sheet 1
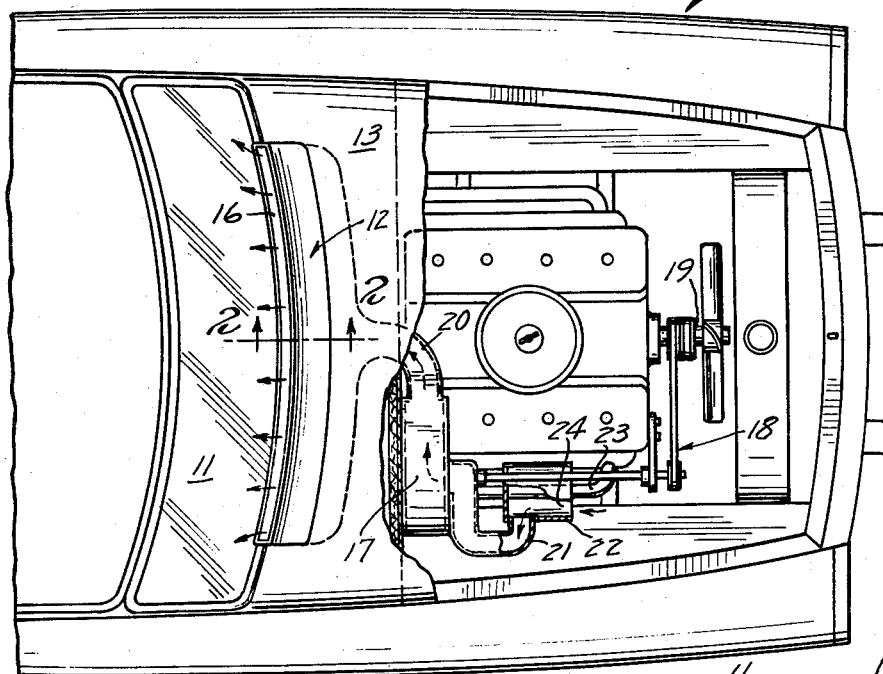
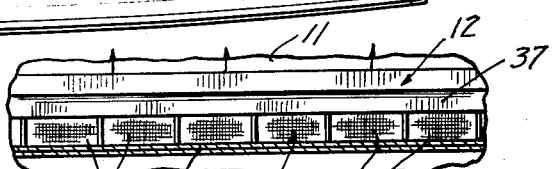
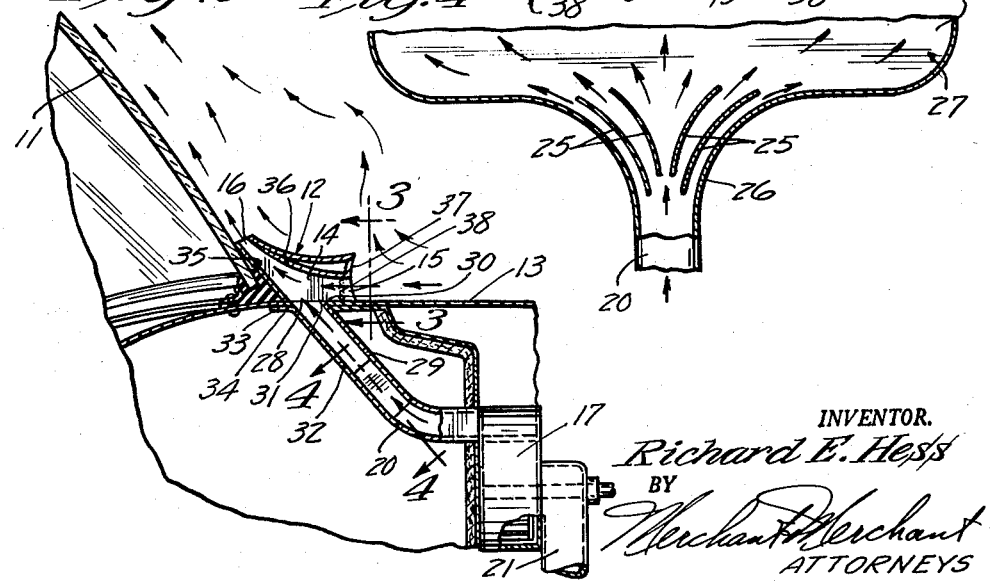
INVENTOR.
Richard E. Hess
BY
Merchant & Merchant
ATTORNEYS

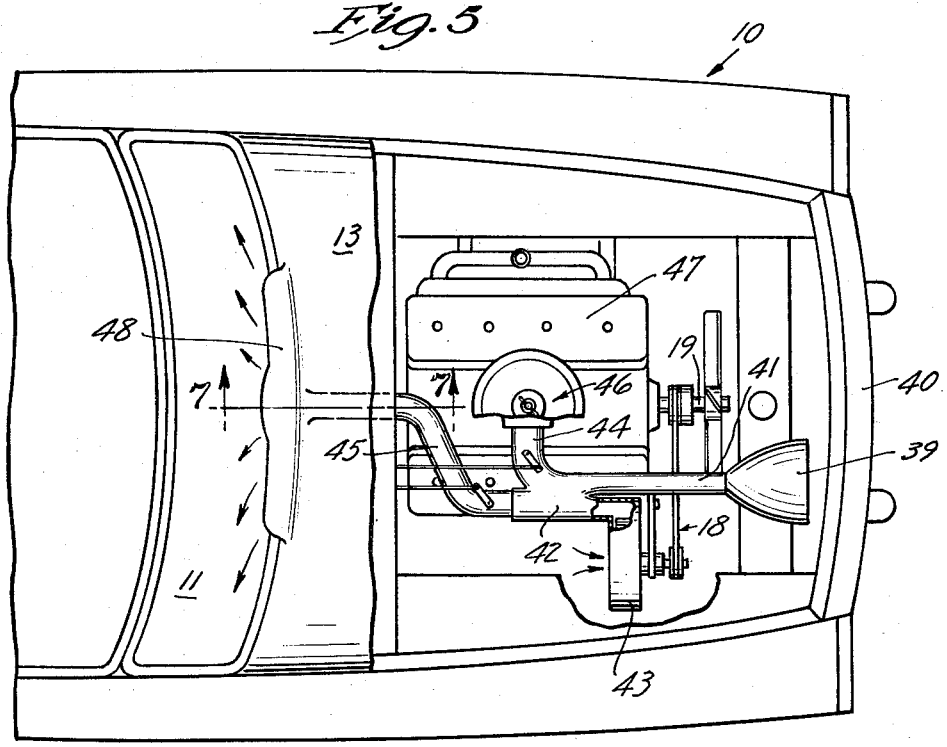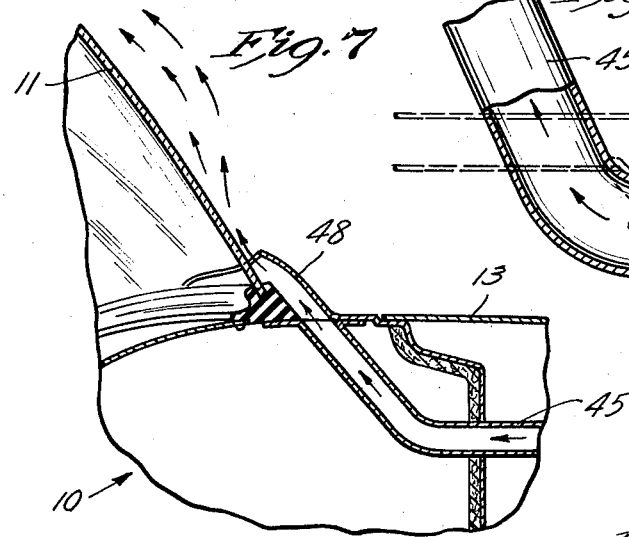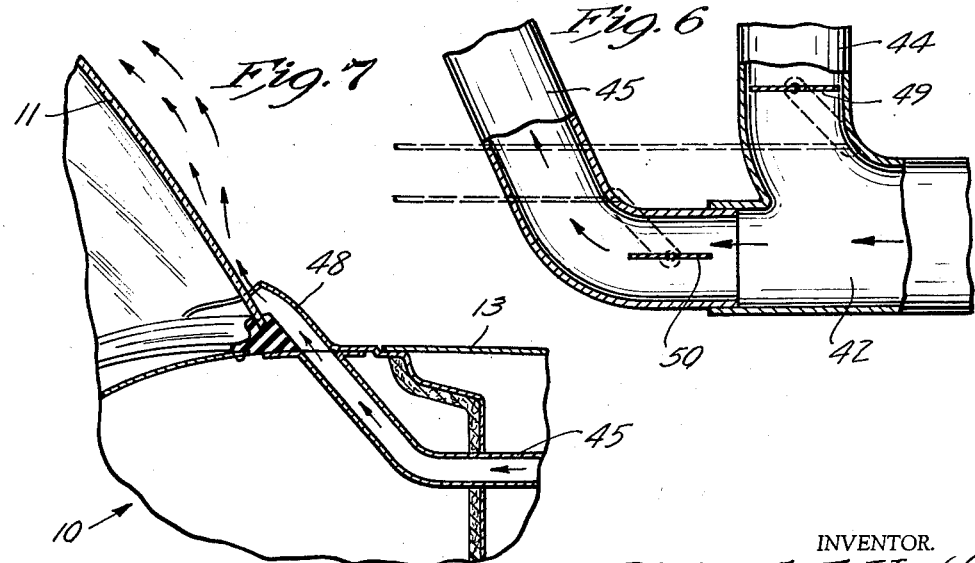

United States Patent Office
2,926,396
Patented Mar. 1, 1960

2,926,396
BLOWER FOR MOTOR-DRIVEN VEHICLES HAVING WINDSHIELDS
Richard E. Hess, Minneapolis, Minn., assignor of fifty percent to Dick P. Rumell, Minneapolis, Minn.
Application November 27, 1957, Serial No. 701,690
1 Claim. (Cl. 20—40.5)

My invention relates to a blower for motor-driven vehicles having windshields; and is in the nature of a continuation-in-part of my copending application, Serial No. 501,766, filed April 18, 1955, "Blower for Motor-Driven Vehicles Having Windshields." In particular, my invention relates to a blower having a mixing chamber which combines air from two sources, one source being an engine-driven blower and the second consisting of air scooped into the mixing chamber as a result of forward motion of the vehicle. The air from the aforesaid two sources is combined in the mixing chamber and then directed either in a high velocity jet over the outer surface of the windshield of the vehicle or directed to the carburetor to supercharge the engine, as desired.

One object of my invention is to provide in a blower system for motor-driven vehicles having windshields, a mixing chamber adapted to receive one source of air under pressure as a result of the forward motion of the vehicle and a second source of air under pressure from an engine-driven blower and to direct these combined air pressures from a common outlet or outlets of the mixing chamber in a high velocity jet over the outer surface of the windshield for the purpose of deflecting bugs, rain, snow, sleet, frost and the like. Although it is now known in the art to provide means for directing an air blast over the outside surface of a windshield from two independent sources of air, I have found that the combining of said sources of air in a common mixing chamber greatly increases the effectiveness of the two sources of air. In fact, from actual tests conducted it has been determined that the air pressure achieved by combining two air streams in a mixing chamber prior to discharge over the windshield, was greater by between three to four foot pounds per square inch than that achieved by separate air streams of like volume and pressure.

A second object of my invention is to provide a mixing chamber adapted to receive one source of air under pressure as a result of the forward motion of the vehicle and a second source of air under pressure from an engine-driven blow and to direct these combined air flows from a common outlet to the carburetor of the engine to supercharge the engine.

A further object of my invention is to provide in a blower for motor-driven vehicles having windshields, a mixing chamber adapted to receive one source of air under pressure as a result of the forward motion of the vehicle, a second source of air under pressure from an engine-driven blower, duct means to direct these combined air pressures or air flows from outlets of the mixing chamber to the outer surface of the windshield of the vehicle and to the carburetor of the vehicle, and valve means for independently controlling the flow of combined air pressures either to the windshield or to the carburetor so that the combined air pressures from the mixing chamber may be directed in a high velocity jet over the outer surface of the windshield of the vehicle or directed to the carburetor of the engine as desired. Utilizing my novel and improved blower both to clear the windshield of the vehicle and as a supercharger not only provides more effective air flow through the combining of the two separate sources of air in a mixing chamber but also provides economy and simplification of structure.

The above and other objects and advantages of my invention will become apparent in the course of the following specification and claims, reference being had to the accompanying drawings wherein like characters indicate like parts throughout the several views:

Fig. 1 is a fragmentary view in top plan, with some parts broken away, showing the front portion of an automobile with my invention in operative position thereon;

Fig. 2 is an enlarged fragmentary view in section taken substantially on the line 2—2 of Fig. 1;

Fig. 3 is an enlarged fragmentary view partly in section and partly in elevation as viewed on line 3—3 of Fig. 2;

Fig. 4 is an enlarged fragmentary view in section as viewed substantially on the line 4—4 of Fig. 2 showing the conduit means between the blower and mixing chamber of my invention;

Fig. 5 is a view corresponding to Fig. 1 but showing a modified form of my invention;

Fig. 6 is an enlarged detail corresponding to a portion of Fig. 5, some parts being broken away and some parts shown in section; and Fig. 7 is an enlarged fragmentary section taken substantially on the line 7—7 of Fig. 5.

Referring with greater particularity to the drawings and initially to the structure of Figs. 1 to 4 inclusive thereof, the numeral 10 indicates in its entirety a motor-driven vehicle, herein shown as an automobile of any conventional type or design, having a windshield 11; however, my invention may be used equally well on other motor-driven vehicles having windshields, such as on airplanes. I provide structure comprising a baffle-like element 12 which is mounted on the fixed body portion of the hood 13 of vehicle 10 adjacent the bottom of windshield 11 and in front thereof; and referring particularly to Fig. 1, baffle-like element 12 extends generally the full width of windshield 11.

Baffle-like element 12 defines a mixing chamber 14, a wide forwardly facing air-scoop inlet opening 15, and a wide upwardly facing air discharge opening 16. Inlet opening 15 is a relatively large opening adapted to scoop air into chamber 14 from across the hood 13 during forward movements of vehicle 10. Discharge opening 16 is relatively restricted as compared to opening 15 to provide for a high velocity discharge from chamber 14.

I provide a blower 17 anhcored to vehicle 10 beneath hood 13 in any suitable manner which is to be driven from the engine of vehicle 10 in any conventional manner, but as shown in Fig. 1 is driven by the drive train, indicated generally by the numeral 18, from the engine crank shaft 19. Blower 17 is preferably of the sirocco-type and has its tangential outlet connected by conduit means 20 to chamber 14 at a place intermediate openings 15 and 16. The inlet to blower 17 is connected to atmosphere preferably through conduit 21 which extends to and is connected to an open-ended cylinder 22, the latter encompassing exhaust manifold or pipe 23 of vehicle 10. The open end 24 of cylinder 22 faces forwardly; and conduit 21 is in communication with cylinder 22 adjacent its opposite end so that air passing through cylinder 22 to blower 17 is heated by exhaust manifold 23.

Referring in particular to Fig. 4, conduit means 20 comprises a funnel-like distributing manifold portion having baffles 25 disposed at the throat 26 thereof to insure an even distribution of the air from blower 17 into the wide mouth 27 of conduit means 20, which is substantially as wide as baffle-like element 12.

Referring in particular to Fig. 2, the body portion of vehicle 10, which has been designated as the fixed body portion of the hood thereof and indicated by the numeral 13, has a slot or opening 28 formed therein to permit communication between conduit 20 and chamber 14. Preferably, side wall portion 29 of the mouth 27 extends through slot 28 adjacent the latter's edge 30 to be adjoining and anchored to body portion 13 defining edge 30. Side wall portion 29 of mouth 27 terminates at the top surface of the body portion or hood 13 to provide for smooth surfaces adjacent the place indicated by the numeral 31. Further, the opposite side wall portion 32 of mouth 27 is outwardly turned adjacent its upper end and this outwardly turned portion 33 is anchored to the body portion or hood 13 defining edge 34 of slot 28 by any suitable means. Back wall 35 of baffle-like element 12 and side wall portion 32 of mouth 27 meet with body portion or hood 13 defining edge 34 in coplanar relationships so that there is a smooth flow surface adjacent edge 34 of slot 28. The connection of conduit 20 with chmaber 14 as preferably shown in Fig. 2 provides for smooth flow surfaces adjacent the point indicated by the numeral 31 and adjacent edge 34 which insures a smooth unobstructed flow of air from conduit means 20 into chamber 14 and insures that the connection of conduit means 20 to chamber 14 will not obstruct or interfere with the flow of air from inlet opening 15 through chamber 14. Internal top wall 36 of baffle-like element 12 extends from inlet opening 15 to discharge opening 16 in a smooth arcuate form to provide for smooth uninterrupted and unobstructed air flow from inlet opening 15 through chamber 14. The air pressure from blower 17 and the air pressure from inlet opening 15 are directed together by back wall 35 and internal top wall 36 of baffle-like element 12 in a manner to insure a smooth non-turbulent combining thereof within the chamber 14 for movement in common toward and out the outlet opening 16.

Baffle-like element 12 forms a forwardly facing concave front wall 37 above the opening 15 to deflect air generally upwardly to create an eddy current moving generally at right-angles initially to the main current of air moving towards the windshield 11 on forward motion of vehicle 10, which aids in the deflection of bugs, rain, snow, and the like from the windshield 11.

I further provide screen means indicated generally by the numeral 38 in chamber 14 adjacent inlet opening 15 and generally at rightangles to the flow of air into chamber 14 for screening the air passing into chamber 14 of all foreign matter. Screen means 38 prevents bugs, dust, snow, and other foreign matter from passing into chamber 14 and from possibly clogging the restricted outlet opening 16.

When vehicle 10 is standing with the engine idling, blower 17 provides a blast of air over the outer surface of windshield 11 sufficient to deflect rain, snow and the like away from the windshield 11 over its entire surface. This blast of air is heated to prevent and/or to remove frost or ice on the windshield, outside or in. When the car is in motion, the air from blower 17 will mix in chamber 14 with the air entering chamber 14 from over the hood 13 through inlet opening 15. Blower 17 is driven by the engine of vehicle 10 so that the speed of blower 17 increases and decreases proportional to engine speed. The pressure of the air entering chamber 14 through inlet opening 15 upon the forward motion of vehicle 10 will likewise be directly proportional to the speed of vehicle 10. The additive pressures of the air from blower 17 and from over the hood 13 through inlet opening 15 are sufficient at all speeds of vehicle 10 to deflect all of the elements in question away from the windshield 11.

Although means for directing an air blast over the outside surface of the windshield for the purpose of deflecting the elements in question, either by engine-driven blower or by air coming over the top of the hood as a result of forward motion of the vehicle, has been previously known, my invention provides a novel improvement effective where others would fail, even over the aggregating of the two aforementioned sources of air each acting independently to produce an air blast over the same windshield. By combining and mixing two sources of air in the mixing chamber 14 and then blasting these combined additive pressures of air from the common outlet 16 of mixing chamber 14 in a high velocity jet, I provide a more effective and efficient blower for protecting and keeping clear the windshield 11 of the vehicle 10 than any previous blower system now known in the art.

In the modified arrangement of Figs. 5 to 7 inclusive, those portions of the motor vehicle 10, which are identical to those shown and described in the structures of Figs. 1 to 4 inclusive, are identified by like reference characters. However, here the air scoop 39 is located immediately behind the grill 40. Air under pressure, due to forward movement of the vehicle 10, moves through a restricted conduit 41 to a mixing chamber 42 where it is joined with a stream of air under pressure discharged from a fan or blower 43 driven through the medium of a belt 18. It will be noted that two discharge ducts 44 and 45 lead from the mixing chamber 42, the former to the inlet side of the carburetor system 46 of the motor 47, and the latter to a wide defusing mouth or funnel 48 located immediately forwardly of the windshield 11. Manually controllable valves, preferably and as shown in the nature of butterfly valves 49 and 50, are positioned in the ducts 44 and 45 respectively, whereby the air from the mixing chamber 42 may be selectively directed either entirely to the carburetor system 46 or to the defuser nozzle 48, or partially to each as a given situation may require.

As above indicated, my device has been thoroughly tested and found to be completely satisfactory for the accomplishment of the above objects and while I have disclosed two separate embodiments thereof, I wish it to be specifically understood that my invention may well be capable of still further modification without departure from the scope and spirit of the appended claim.

What I claim is:

A windshield clearer for vehicles having windshields, said clearer comprising a structure defining a mixing chamber adjacent the lower edge of and in advance of a windshield, said mixing chamber having a laterally elongated forwardly facing air intake opening leading thereinto, and a laterally elongated upwardly facing air discharge opening for directing a stream of air from said mixing chamber upwardly over the outer surface of a windshield, means for supplying heated air into said mixing chamber including a blower having intake and discharge openings, the intake opening of said blower being open to the atmosphere at a point remote from said mixing chamber, conduit means connecting the outlet of said blower to said mixing chamber intermediate the air intake and air discharge openings thereof for mixing the air from the blower with the air entering the mixing chamber through the forwardly facing air intake opening thereof prior to discharge of all the air through the discharge opening of the mixing chamber, said conduit means including a funnel like manifold portion adjacent the mixing chamber and having a plurality of diverging baffle members therein for even distribution of heated air into the mixing chamber; and a forwardly facing generally concave front wall disposed adjacent to and upwardly from the forwardly facing air intake opening of the mixing chamber for producing eddy currents in front of the stream of air.

References Cited in the file of this patent
UNITED STATES PATENTS

| 1,743,395 | Rinehart | Jan. 14, 1930 |
| 1,902,254 | Morehouse | Mar. 21, 1933 |